US 8,136,363 B2
Mar. 20, 2012

(12) United States Patent
Ludwig (54) TEMPERATURE CONTROL SYSTEM AND METHOD OF OPERATING THE SAME (75) Inventor: Brad Ludwig, Minnetonka, MN (US)

(73) Assignee: Thermo King Corporation, Minneapolis, MN (US)

( * ) Notice: Subject to any disclaimer, the term of this patent is extended or adjusted under 35 U.S.C. 154(b) by 1346 days.

(21) Appl. No.: 11/403,611

(22) Filed: Apr. 13, 2006

(65) Prior Publication Data
US 2006/0248904 A1 Nov. 9, 2006

Related U.S. Application Data (60) Provisional application No. 60/671,716, filed on Apr. 15, 2005.

(51) Int. Cl.
F25D 21/06 (2006.01)
(52) U.S. Cl. ............... 62/151; 62/80; 62/81; 62/150; 62/153; 62/208; 62/244
(58) Field of Classification Search ............ 62/150, 62/151, 153, 80, 208, 81, 244
See application file for complete search history.

(56) References Cited

U.S. PATENT DOCUMENTS

| | | | | |
|---|---|---|---|---|
| 4,735,055 A * | 4/1988 | Taylor et al. | | 62/115 |
| 5,586,445 A * | 12/1996 | Bessler | | 62/126 |
| 6,205,800 B1 * | 3/2001 | Topper et al. | | 62/156 |
| 6,578,373 B1 * | 6/2003 | Barbier | | 62/158 |
| 6,910,341 B2 | 6/2005 | Srichai et al. | | |
| 6,964,173 B2 * | 11/2005 | Dobmeier et al. | | 62/129 |
| 7,032,395 B2 | 4/2006 | Hanson et al. | | |
| 7,367,198 B2 * | 5/2008 | Behr | | 62/89 |
| 7,536,867 B2 | 5/2009 | Kaga et al. | | |
| 2003/0115900 A1 * | 6/2003 | Matsumoto et al. | | 62/278 |
| 2003/0202557 A1 * | 10/2003 | Hanson et al. | | 374/109 |
| 2004/0050083 A1 * | 3/2004 | Yuasa et al. | | 62/222 |
| 2005/0066671 A1 | 3/2005 | Srichai et al. | | |

FOREIGN PATENT DOCUMENTS

| | | |
|---|---|---|
| JP | 10197110 | 7/1998 |
| JP | 10197111 | 7/1998 |

* cited by examiner

Primary Examiner — Frantz Jules
Assistant Examiner — Azim Rahim
(74) Attorney, Agent, or Firm — Michael Best & Friedrich LLP (57) ABSTRACT A method of conditioning air in a vehicle load space. The method includes providing a refrigeration circuit including an evaporator, directing refrigerant through the refrigeration circuit, directing load space air across the evaporator, sensing a first condition based on one of a temperature and a pressure of the refrigerant in the refrigeration circuit upstream from the evaporator, determining a second condition based on one of a temperature and a pressure of the refrigerant in the evaporator, determining a difference between the first condition and the second condition, and initiating a defrost process of the evaporator when the difference is greater than a threshold.

17 Claims, 8 Drawing Sheets

TEMPERATURE CONTROL SYSTEM AND METHOD OF OPERATING THE SAME

RELATED APPLICATIONS

This application claims the benefit of prior-filed, co-pending U.S. Provisional Patent Application Ser. No. 60/671,716 filed on Apr. 15, 2005, the entire content of which is incorporated by reference herein.

FIELD OF THE INVENTION

The invention relates to temperature control systems and, more particularly, to a transport temperature control system and to a method of operating the same.

SUMMARY

Some embodiments of the present invention provide a temperature control system for conditioning air in a load space. The temperature control system can include a compressor, an evaporator coil, a condenser, a refrigeration circuit extending between the compressor, the evaporator coil, and the condenser, and a controller programmed to control operation of the temperature control system and to regulate flow of refrigerant through the refrigeration circuit. The controller can be programmed to operate the temperature control system in a defrost mode based on data received from one or more sensors distributed along the refrigeration circuit.

In addition, some embodiments of the invention provide a method for controlling operation of a temperature control system having a refrigeration circuit extending between a compressor and an evaporator coil. The method can include the acts of sensing a pressure of refrigerant flowing through the refrigeration circuit, calculating a saturated suction pressure, providing an acceptable range of saturation suction pressure, comparing the saturated suction pressure to the acceptable range of saturation suction pressure, and initiating defrost when the saturation suction pressure is outside the acceptable range of saturation suction pressure.

In some embodiments, the invention provides a method of conditioning air in a vehicle load space. The method can include the acts of providing a refrigeration circuit including an evaporator, directing refrigerant through the refrigeration circuit, and directing load space air across the evaporator. The method can also include the acts of sensing a first condition based on one of a temperature and a pressure of the refrigerant in the refrigeration circuit upstream from the evaporator, determining a second condition based on one of a temperature and a pressure of the refrigerant in the evaporator, and determining a difference between the first condition and the second condition. The method can include the act of initiating a defrost process of the evaporator when the difference is greater than a threshold.

The invention can also provide a method of conditioning air in a vehicle load space, the vehicle having an opening communicating between the load space and atmosphere and a door supported on the vehicle adjacent to the opening. The method can include the acts of providing a refrigeration circuit including an evaporator, directing refrigerant through the refrigeration circuit, and directing load space air across the evaporator. The method can also include moving the door relative to the vehicle between an opened position, in which the door is moved away from the opening, and a closed position, in which the door extends across the opening, and sensing a first condition, the first condition being a function of one of a temperature and a pressure of the refrigerant in the refrigeration circuit away from the evaporator. Furthermore, the method can include the acts of measuring one of a temperature and a pressure of the refrigerant in the evaporator, using the one of the temperature and the pressure of the refrigerant in the evaporator to determine a second condition, determining a difference between the first condition and the second condition, and initiating a defrost process of the evaporator when the difference is greater than a threshold and the door is in the opened position.

In some embodiments, the invention provides a system for conditioning air in a load space of a vehicle. The vehicle can have an opening communicating between the load space and atmosphere and a door movable between an opened position and a closed position. In the opened position, the air is movable through the opening between atmosphere and the load space. In the closed position, the door prevents movement of the air through the opening. The system can include a refrigeration circuit that further includes an evaporator housing refrigerant, first and second sensors, and a controller. The first sensor can be positioned along the refrigeration circuit to sense a first condition that is a function of one of a temperature and a pressure of the refrigerant in the refrigeration circuit away from the evaporator. The second sensor can be positioned along the evaporator to sense one of a temperature and a pressure of the refrigerant in the evaporator. The controller can convert the one of the temperature and the pressure of the refrigerant in the evaporator into a second condition, determine a difference between the first condition and the second condition when the door is in the opened position, and initiate a defrost process of the evaporator when the difference is greater than a threshold Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted,"

"connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of actual systems. As noted, many of the modules and logic structures described are capable of being implemented in software executed by a microprocessor or a similar device or of being implemented in hardware using a variety of components including, for example, application specific integrated circuits ("ASICs"). Terms like "controller" may include or refer to hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, the claims should not be limited to the specific examples or terminology or to any specific hardware or software implementation or combination of software or hardware.

Figure 1:
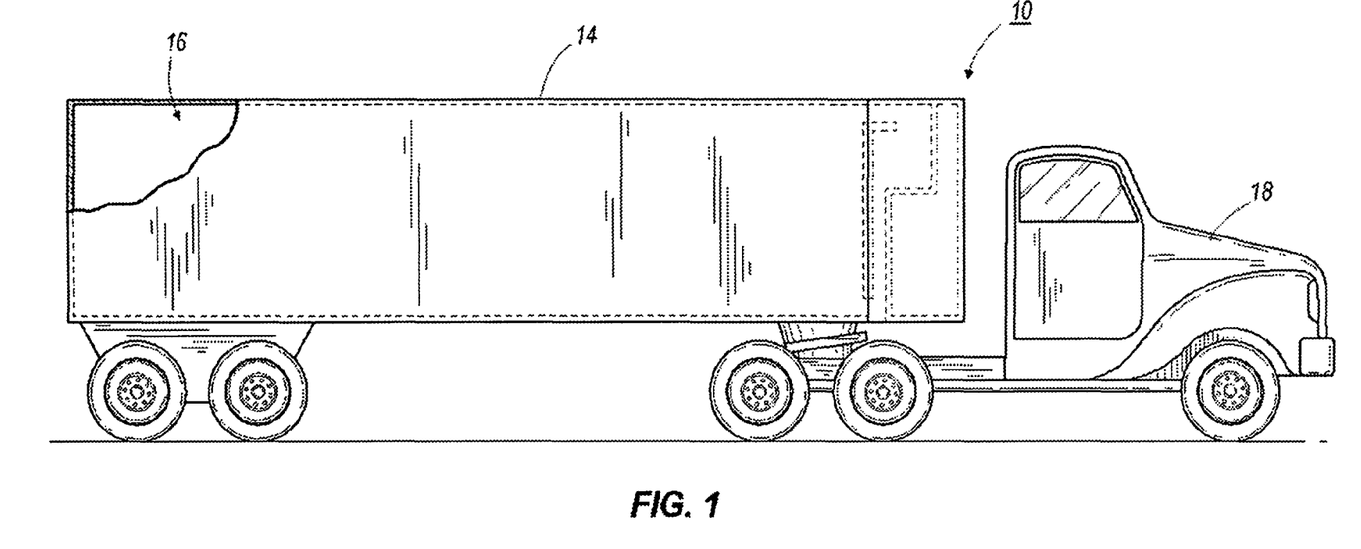
FIG. 1 is a side view of a vehicle having a temperature control system according to an embodiment of the present invention.

FIG. 1 illustrates a temperature control system 10 according to some embodiments of the present invention. The temperature control system 10 is especially suitable for use in transport applications and can be mounted on a container, truck, trailer, and the like. The illustrated embodiment of FIG. 1 shows the temperature control system 10 mounted on a trailer 14 having a load space 16. The trailer 14 is pulled by a tractor 18, as is understood by those skilled in the art. In other embodiments (not shown), the temperature control system 10 can be mounted on a storage container or another vehicle, such as, for example, a truck, a railcar, a van, etc.

As used herein, the term "load space" includes any space to be temperature and/or humidity controlled, including transport and stationary applications for the preservation of food, beverages, plants, flowers, and other perishables and maintenance of a desired atmosphere for the shipment of industrial products. Also, as used herein, the term "refrigerant" includes any conventional refrigeration fluid, such as, for example, chlorofluorocarbons (CFCs), hydrocarbons, cryogens (e.g., $CO_2$, and $N_2$), etc. In addition, as used herein, the term "refrigerant" refers to fluids commonly used for heating and defrosting purposes.

Figure 2:
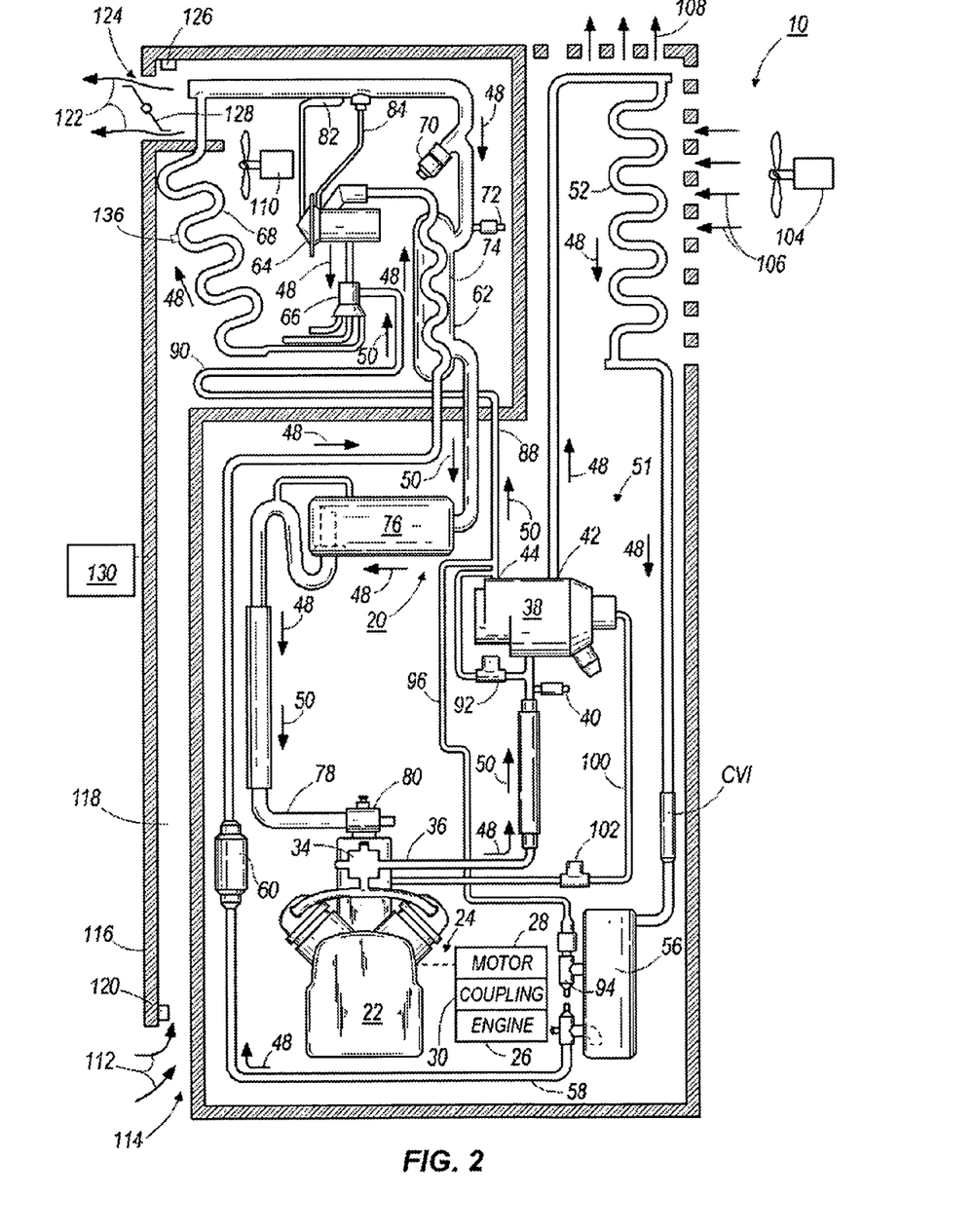
FIG. 2 is a schematic representation of the temperature control system shown in FIG. 1.

The temperature control system 10 controls the temperature of the load space 16 to a desired temperature range adjacent to a predetermined set point temperature. More particularly, the temperature control system 10 maintains the temperature of the load space 16 within a range surrounding the set point temperature (e.g., ±5° C.). As shown in FIG. 2, the temperature control system 10 includes a closed refrigerant circuit or flow path 20, which includes a refrigerant compressor 22 driven by a drive unit 24. In the illustrated embodiment, the drive unit 24 includes an internal-combustion engine 26 and a stand-by electric motor 28. The engine 26 and the motor 28, when both are utilized, are connected to the compressor 22 by a clutch or coupling 30 which disengages the engine 26 while the motor 28 is in operation.

In some embodiments, such as the illustrated embodiment of FIG. 2, the temperature control system 10 can include a dedicated engine 26. In other embodiments, the vehicle engine can also or alternately supply power to the temperature control system 10 or elements of the temperature control system 10.

A discharge valve 34 and a discharge line 36 connect the compressor 22 to a three-way valve 38. A discharge pressure transducer 40 is located along the discharge line 36, upstream from the three-way valve 38 to measure the discharge pressure of the compressed refrigerant. The three-way valve 38 includes a first outlet port 42 and a second outlet port 44.

When the temperature control system 10 is operated in a COOLING mode, the three-way valve 38 is adjusted to direct refrigerant from the compressor 22 through the first outlet port 42 and along a first circuit or flow path (represented by arrows 48). When the temperature control system 10 is operated in HEATING and DEFROST modes, the three-way valve 28 is adjusted to direct refrigerant through the second outlet port 44 and along a second circuit or flow path (represented by arrows 50).

The first flow path 48 extends from the compressor 22 through the first outlet port 42 of the three-way valve 38, a condenser coil 52, a one-way condenser check valve CV1, a receiver 56, a liquid line 58, a refrigerant drier 60, a heat exchanger 62, an expansion valve 64, a refrigerant distributor 66, an evaporator coil 68, an electronic throttling valve 70, a suction pressure transducer 72, a second path 74 through the heat exchanger 62, an accumulator 76, a suction line 78, and back to the compressor 22 through a suction port 80. The expansion valve 64 is controlled by a thermal bulb 82 and an equalizer line 84.

The second flow path 50 can bypass a section of the refrigeration circuit 51, including the condenser coil 52 and the expansion valve 64, and can connect the hot gas output of compressor 22 to the refrigerant distributor 66 via a hot gas line 88 and a defrost pan heater 90. The second flow path 50 continues from the refrigerant distributor 66 through the evaporator coil 68, the throttling valve 70, the suction pressure transducer 72, the second path 74 through the heat exchanger 62, and the accumulator 76 and back to the compressor 22 via the suction line 78 and the suction port 80.

A hot gas bypass valve 92 is disposed to inject hot gas into the hot gas line 88 during operation in the COOLING mode. A bypass or pressurizing line 96 connects the hot gas line 88 to the receiver 56 via check valves 94 to force refrigerant from the receiver 56 into the second flow path 50 during operation in the HEATING and DEFROST modes.

Line 100 connects the three-way valve 38 to the low-pressure side of the compressor 22 via a normally closed pilot valve 102. When the valve 102 is closed, the three-way valve 38 is biased (e.g., spring biased) to select the first outlet port 42 of the three-way valve 38. When the evaporator coil 52 requires defrosting and when heating is required, valve 92 is energized and the low pressure side of the compressor 22 operates the three-way valve 38 to select the second outlet port 44 to begin operation in the HEATING mode and/or DEFROST modes.

A condenser fan or blower 104 directs ambient air (represented by arrows 106) across the condenser coil 52. Return air (represented by arrows 108) heated by contact with the condenser fan 104 is discharged to the atmosphere. An evaporator fan 110 draws load space air (represented by arrows 112) through an inlet 114 in a bulkhead or wall 116 and upwardly through conduit 118. A return air temperature sensor 120 measures the temperature of air entering the inlet 114. An evaporator coil temperature sensor 136 can be positioned adjacent to or on the evaporator coil 68 for recording the evaporator coil temperature. In other embodiments, the evaporator coil temperature sensor 136 can be positioned in other locations. In still other embodiments, other sensors, such as, for example, the return air temperature sensor 120 and/or the discharge air temperature sensor (described below) 126 can also or alternately be used to calculate the evaporator coil temperature.

Discharge air (represented by arrow 122) is returned to the load space 14 via outlet 124. Discharge air temperature sensor 126 is positioned adjacent to the outlet 124 and measures the discharge air temperature. During the DEFROST mode, a damper 128 is moved from an opened position (shown in FIG. 2) toward a closed position (not shown) to close the discharge air path to the load space 14.

The temperature control system 10 also includes a controller 130 (e.g., a microprocessor). The controller 130 receives data from sensors, including the return air temperature sensor 124 and the discharge air temperature sensor 126. Additionally, given temperature data and programmed parameters, the controller 130 determines whether cooling, heating, or defrosting is required by comparing the data collected by the sensors with the set point temperature.

FIGS. 3A-3D illustrate a method of monitoring and controlling operation of the temperature control system 10. Particularly, FIGS. 3A-3D show a flow chart of an exemplary defrost process 200 that may be carried out by a combination of software, firmware, or hardware.

Figure 3A:
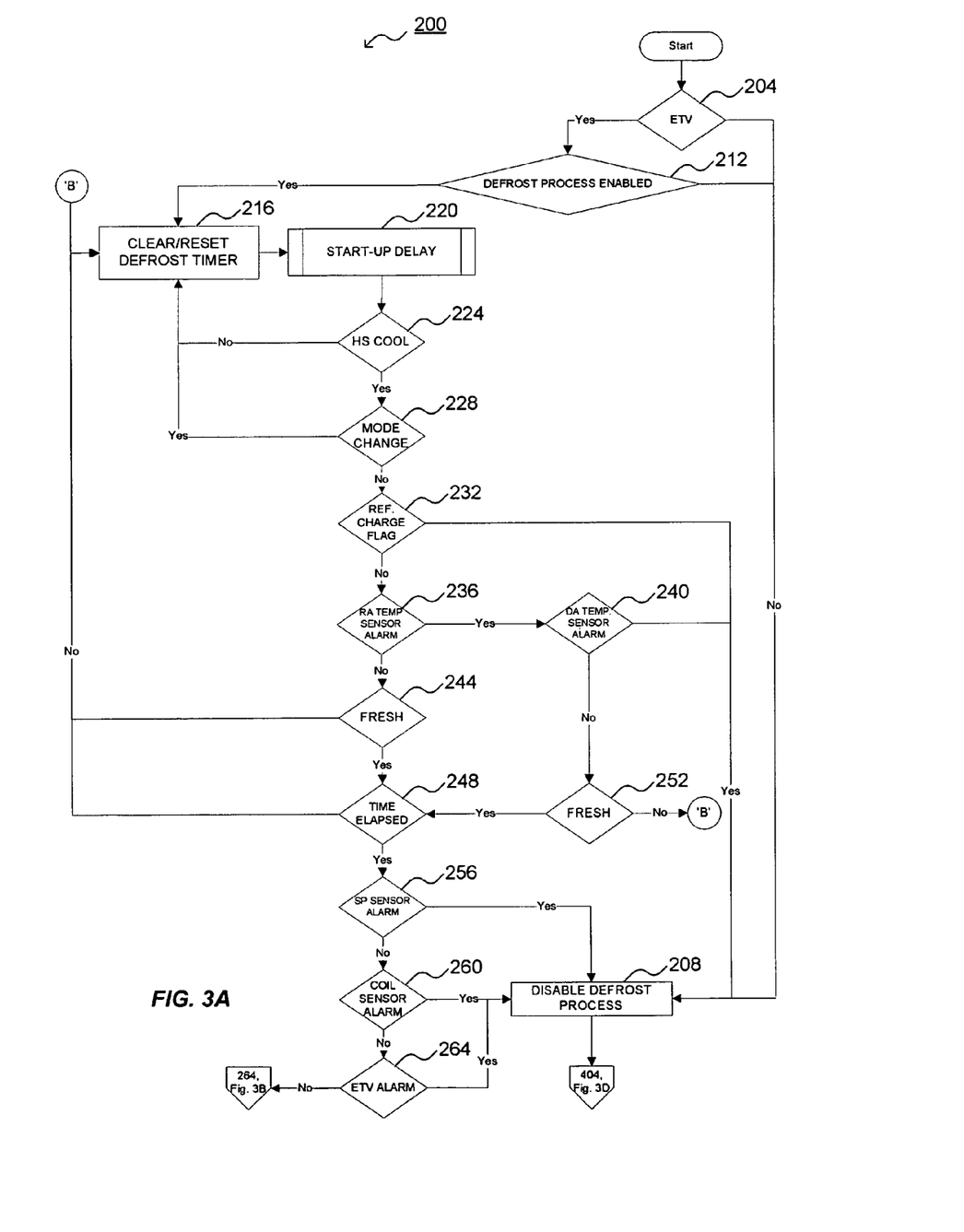
FIGS. 3A-3D are flowcharts illustrating a method of monitoring and controlling operation of the temperature control system shown in FIG. 1.

Each time the temperature control system 10 is switched on (e.g., booted-up), the controller 130 initiates a startup routine. Among other things, the startup routine determines if the temperature control system 10 is operating correctly and searches for errors in the controller's programming and mechanical failures in the temperature control system 10.

In some embodiments, the controller 130 prompts the operator to enter load parameters. For example, the controller 130 can prompt the operator to enter the set point temperature (e.g., 0° C.), a low temperature limit (e.g., 5° C.), and a high temperature limit (e.g., 5° C.). In other embodiments, the controller 130 prompts the operator to enter the type of load (e.g., lettuce, bananas, flowers, ice cream, milk, etc.) and the anticipated travel time (e.g., one hour, two hours, etc.). In these embodiments, the controller 130 recalls previously programmed set point temperature, low temperature limit, and high temperature limit values for the selected load type.

During startup, the controller 130 initiates temperature control operations. More particularly, the controller 130 receives temperature and/or pressure data from sensors, such as, for example, temperature sensors 120, 126, 136 and the discharge pressure transducer 40. If the temperature data supplied to the controller 130 is above the high temperature limit, the controller 130 can be programmed to initiate operation in a high speed or HS COOLING mode or a low speed LS COOLING mode.

During operation in the HS COOLING mode and the LS COOLING mode, the controller 130 is programmed to activate the compressor 22, the condenser fan 104, the evaporator fan 110, the return air temperature sensor 120, and the discharge air temperature sensor 126 and to direct refrigerant along the first flow path 48 to provide relatively low temperature refrigerant to the evaporator coil 68.

If the temperature data supplied to the controller 130 is below the low temperature limit, the controller 130 can be programmed to initiate operation in a HEATING mode. During operation in the HEATING mode, refrigerant is directed along the second flow path 50 to provide heat to the load space 16 as explained above.

During operation in the HS COOLING mode and/or the LS COOLING mode, frost and/or ice can accumulate on the evaporator coil 68. In applications in which relatively warm loads or loads that are not pre-cooled are loaded into the load space 16 and in applications in which a load space door 140 is left open to the atmosphere for extended periods of time, relatively large quantities of frost and ice can accumulate on the evaporator coil 68 relatively rapidly. In these applications, the ice and frost can act as an insulator, reducing and/or preventing heat transfer between load space air 112 and the refrigerant flowing through the evaporator coil 68.

In some embodiments of the present invention, the controller 130 can be programmed to periodically operate in a DEFROST mode to remove and/or reduce the formation of frost and ice. In these embodiments, the temperature control system 10 can be operated in the DEFROST mode periodically (e.g., for ten minutes every hour) and/or when the controller 130 calculates that the ice and frost is reducing the heat transfer between the load space air 112 and the refrigerant flowing through the evaporator coil 68.

In some embodiments, the controller 130 can include a DEFROST CONTROL ALGORITHM or a defrost process 200 for initiating operation in the DEFROST mode. As noted, the algorithm determines if the system 10 is equipped with an electronic throttle valve ("ETV") at step 204 as shown in FIG. 3A. If the defrost process 200 determines at step 204 that the system 10 is not equipped with an electronic throttle valve ("No" at step 204), the process 200 is disabled or shut down at step 208 and an alarm may be activated to alert an operator. However, if the defrost process 200 determines at step 204 that the system 10 is equipped with an electronic throttle valve ("Yes" at step 204), the process 200 proceeds to determine if the process 200 has been selected or enabled at step 212. If the process 200 has not been selected or enabled as determined ("No" at step 212), the process 200 is disabled or shut down at step 208 and an alarm may be activated to alert an operator.

If the process 200 has been selected or enabled ("Yes" at step 212), the process 200 proceeds to clear and reset a number of parameters and timers (e.g., a frozen coil defrost timer) at step 216 such that these parameters and timers have respective predetermined initial values. Thereafter, the process 200 enters a start-up delay at step 220 to allow time for the system 10 to stabilize. In some embodiments, the start-up delay is about 5 minutes.

At step 224, the process 200 determines if the system 10 is running at a high speed ("HS") cooling mode so as to determine if the system 10 or the compressor 22 is running at a predetermined capacity. If the system 10 is not in the high-speed cooling mode ("No" at step 224), the process 200 returns to step 216 to clear and reset the parameters and timers. Otherwise, if the process determines that the system 10 is running at the high-speed cooling mode at step 224 ("Yes" at step 224), the process 200 proceeds to determine if the system 10 is transitioning between different operating modes at step 228.

If it is determined at step 228 that the system 10 is transitioning between different operating modes ("Yes" at step 228), the process 200 returns to step 216 to clear and reset the parameters and timers. However, if the system 10 is not transitioning between different operating modes at step 228 ("No" at step 228), the process 200 checks to determine if there is a leak in the refrigerant circuit 20, if a refrigerant pressure is unacceptable, or if the refrigerant charge is at an unacceptable level at step 232. If there is a leak in the refrigerant circuit 20, if the refrigerant pressure is unacceptable, or if the refrigerant charge is at an unacceptable level ("Yes" at step 232), the process 200 is disabled or shut down at step 208 and an alarm may be activated to alert an operator. Otherwise, if there is no leak in the refrigerant circuit 20, the refrigerant pressure is acceptable, and the refrigerant charge is at an acceptable level ("No" at step 232), the process 200 proceeds to check for any sensor errors, detailed hereinafter.

In the embodiment shown, the process 200 determines if the temperature sensors are functioning properly in the system 10. For example, the process 200 checks to determine if the return air temperature ("RA TEMP") sensor 120 is functioning properly at step 236. In some embodiments, if the return air temperature sensor 120 is not functioning properly, an RA TEMP sensor alarm is generated. If an RA TEMP sensor alarm has been generated, or is active as determined at step 236 ("Yes" at step 236), the process 200 continues to check if other temperature sensors are functioning properly in the system 10. For example, the process 200 checks to determine if the discharge air temperature ("DA TEMP") sensor 126 is functioning properly at step 240. If the DA TEMP sensor 126 is not functioning properly ("Yes" at step 240), the process 200 is disabled or shut down at step 208 and an alarm may be activated to alert an operator.

If the RA TEMP sensor alarm is not active ("No" at step 236), the process 200 proceeds to compare the RA TEMP with a predetermined temperature at step 244 to determine if the load includes fresh products or frozen products. If the comparison between the RA TEMP and the predetermined temperature indicates frozen products ("No" at step 244), the process 200 returns to step 216 to clear and reset the parameters and timers. Particularly, the controller 130 is programmed to determine whether the RA TEMP corresponds to a "fresh" load or a "frozen" load. In applications in which the return air temperature is less than or equal to a FRFZ value (e.g., about 15° F./–2° C., or about 24° F./–4° C.), the controller 130 is programmed to exit the DEFROST CONTROL ALGORITHM or the process 200. In applications in which the RA TEMP is greater than the FRFZ value, the controller 130 is programmed to continue operation in the DEFROST CONTROL ALGORITHM or the process 200.

However, if the comparison between the RA TEMP and the predetermined temperature indicates fresh products ("Yes" at step 244), the process 200 queries a counter or a timer to confirm that the process 200 has not been activated for a least a predetermined time threshold at step 248. In some embodiments, the time threshold is about 30 minutes. If the time elapsed is less than the time threshold ("No" at step 248), the process 200 returns to step 216 to clear and reset the defrost timer. Otherwise, if the time elapsed is at least equal to the time threshold ("Yes" at step 248), the process 200 continues as follows. Particularly, if the controller 130 determines that the temperature control system 10 has been operated in the DEFROST mode within the minimum allowable time or the time threshold, the controller 130 can be programmed to exit the DEFROST CONTROL ALGORITHM or the process 208 to prevent the temperature control system 10 from repeatedly or continually operating in the DEFROST mode.

Referring back to step 240, if the DA TEMP sensor 126 is functioning properly ("No" at step 240), the process 200 continues to determine from the DA TEMP if the load includes fresh products at step 252. Particularly, if the DA TEMP indicates that the load includes frozen products ("No" at step 252), the process 200 returns to step 216 to clear and reset the parameters and timers. However, if the DA TEMP indicates that the load includes fresh products ("Yes" at step 252), the process 200 enters step 248 as described earlier.

After the process 200 has determined at step 248 that the time elapsed is at least equal to the time threshold ("Yes" at step 248), the process 200 determines if the suction pressure ("SP") transducer or sensor is functioning properly at step 256. If the SP sensor 72 is not functioning properly, a SP alarm is activated. If the SP alarm is activated ("Yes" at step 256), the process 200 is disabled or shut down at step 208. Otherwise, if the SP sensor 72 is functioning properly ("No" at step 256), or if the SP alarm is not active, the process 200 determines if the coil sensor 136 is functioning properly at step 260.

If the coil sensor 136 is functioning properly, a coil sensor alarm is deactivated. Otherwise, if the coil sensor 136 does not function properly, the coil sensor alarm is activated. If the process 200 determines that the coil sensor alarm is active at step 260 ("Yes" at step 260), the process 200 is disabled at step 208. Otherwise, if the coil sensor alarm is deactivated as determined at step 260 ("No" at step 260), the process 200 proceeds to determine if the electronic throttle valve ("ETV") 70 is functioning properly at step 264. If the electronic throttle valve 70 is not functioning properly ("Yes" at step 264), an ETV alarm is activated. If the ETV alarm is activated ("Yes" at step 264), the process 200 is disabled or shut down at step 208. However, if the electronic throttle valve 70 is functioning properly ("No" at step 264), the process 200 continues as follows.

Figure 3B:
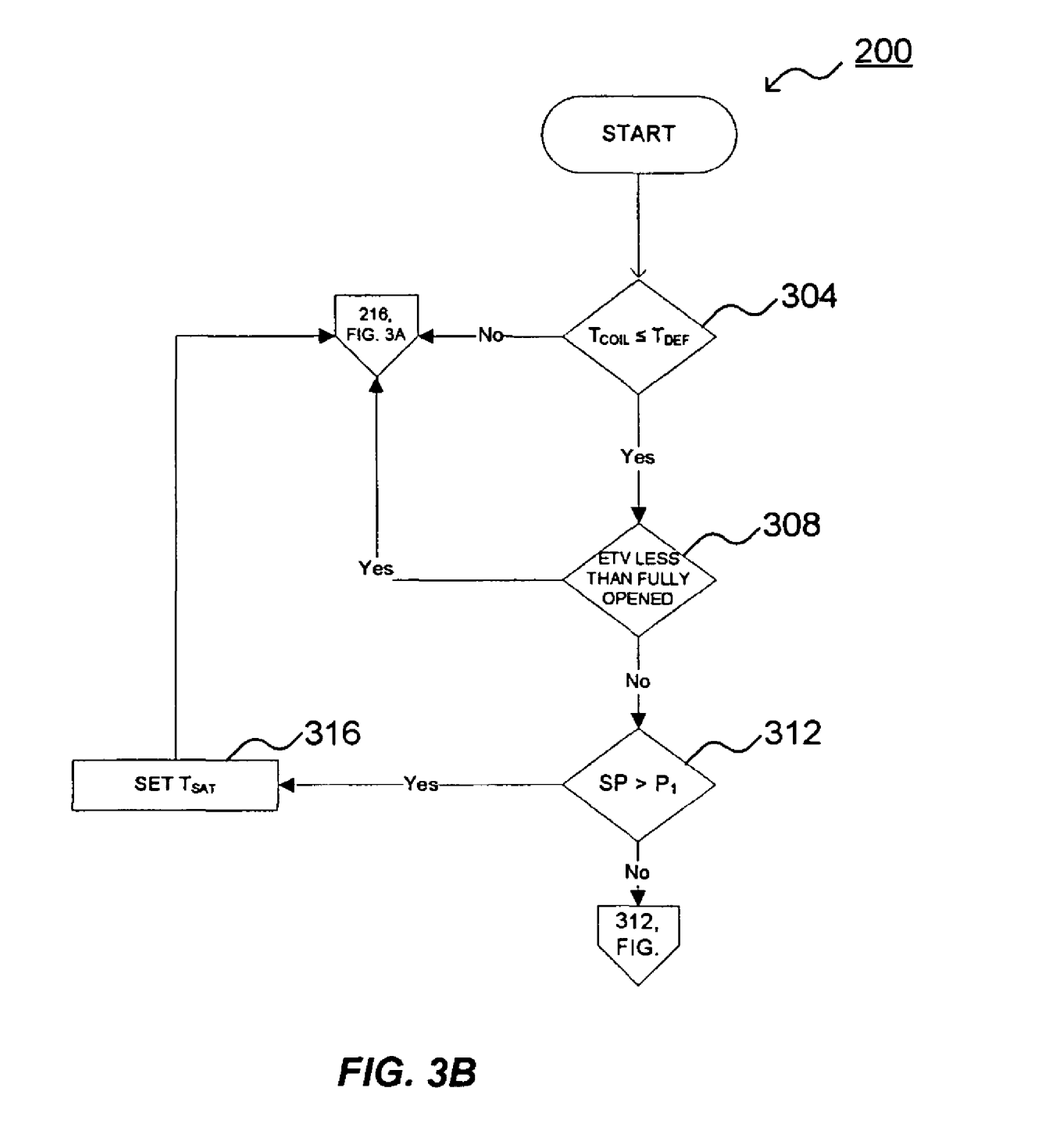

As shown in FIG. 3B, after the process 200 determines that all sensors and valves function properly, the process 200 compares a temperature ($T_{COIL}$) measured at the coil sensor 136 with a defrost initiation temperature ($T_{DEF}$) at step 304. In some embodiments, the defrost initiation temperature $T_{DEF}$ is about 45° F. or about 7° C. If the process 200 determines that $T_{COIL}$ is greater than $T_{DEF}$ ("No" at step 304), the process 200 returns to step 216 of FIG. 3A. Otherwise, if the coil temperature $T_{COIL}$ is less than or equal to the defrost initiation temperature $T_{DEF}$ ("Yes" at step 304), the process 200 measures a position of the ETV 70 against a predetermined value at step 308. In some embodiments, the predetermined position is a fully opened position. If the ETV position is less than fully opened as determined at step 308 ("Yes" at step 308), the process 200 returns to step 216 of FIG. 3A. If the ETV position is fully opened as determined at step 308 ("No" at step 308), the process 200 compares the suction pressure ("SP") measured at the SP sensor 72 with a predetermined pressure value $P_1$ (e.g., 100 PSIG) at step 312.

If the suction pressure SP is greater than the predetermined pressure value $P_1$ ("Yes" at step 312), the process 200 enters step 316 to set a saturation suction temperature $T_{SAT}$ to a predetermined temperature value. In some embodiments, $T_{SAT}$ is set to be about 50° F. or 10° C. However, other predetermined temperature values can also be used at step 316. After the process 200 has set a saturation suction temperature $T_{SAT}$ at step 316, the process 200 returns to step 216 of FIG. 3A. If the suction temperature SP is not greater than the predetermined pressure value $P_1$ as determined at step 312 ("Yes" at step 312), the process 200 continues as follows.

Figure 3C:
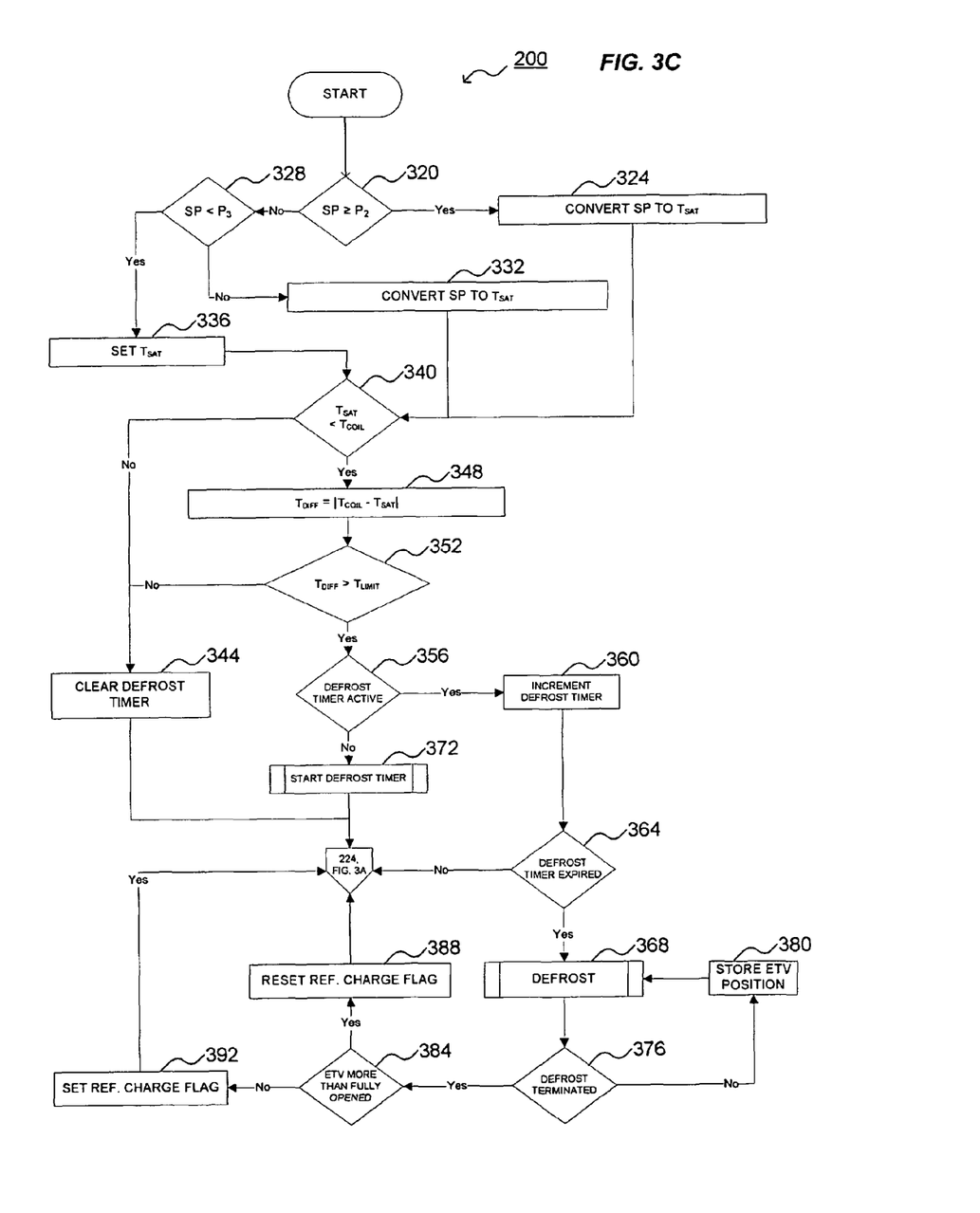

If the suction pressure SP is less than the predetermined pressure value $P_1$ ("No" at step 312), the process 200 determines if the suction pressure SP falls within a range as shown in FIG. 3C. If suction pressure SP is greater than or equal to a high end predetermined pressure value $P_2$ ("Yes" at step 320), the process 200 converts the suction pressure SP into a saturation suction temperature $T_{SAT}$ using a conversion process at step 324.

In the illustrated embodiment, the saturation pressure SP is converted into a saturation suction temperature $T_{SAT}$ using a first curve-fit conversion formula at step 324. Exemplary curve-fit formulas include, but are not limited to, non-parametric fitting using splines and interpolants, linear parametric fitting models, such as, straight line approximation, and non-linear parametric fitting models, such as, polynomials derived by curve-fitting techniques, such as, the least square method, weighted least square method, autoregressive moving average, interpolation, extrapolation, differentiation, and integration of fits. In the embodiment shown, the first curve-fit formula is a second order polynomial of the form $a_1x^2+b_1x+c_1$. In some embodiments, the coefficients $a_1$, $b_1$, and $c_1$ are −0.0045, 1.3076, and −39.891, respectively. In other embodiments, the process 200 can also convert the suction pressure SP into a saturation suction temperature $T_{SAT}$ with other pressure-to-temperature formulas or conversion methods at step 324.

If the suction pressure SP is less than the high end predetermined pressure value $P_2$ ("No" at step 320), the process 200 compares the suction pressure SP with a low end predetermined pressure value $P_3$ (e.g., about −10 PSIG) at step 328. If the suction pressure SP is not less than the predetermined pressure value $P_3$, ("No" at step 328, the process 200 converts the suction pressure SP into a saturation suction temperature $T_{SAT}$ using a second curve-fit formula as the conversion process at step 332. However, if the suction pressure SP is less than $P_3$ as determined at step 328 ("Yes" at step 328), the process 200 sets the saturation suction temperature $T_{SAT}$ to a predetermined temperature value (e.g., about −90° F. or about −68° C.) step 336. In the illustrated embodiment, the second curve-fit formula is a second order polynomial of the form $a_2x^2+b_2x+c_2$. In some embodiments, the coefficients $a_2$, $b_2$, and $c_2$ are −0.0718, 2.8678, and −51.895, respectively. Furthermore, the process 200 can also convert the suction pressure into the saturation suction temperature with other pressure-to-temperature formulas or conversion methods at step 332.

After the process 200 has determined the saturation suction temperature $T_{SAT}$ (at steps 324, 332, or 336), the process 200 proceeds to compare the saturation suction temperature $T_{SAT}$ with the coil temperature $T_{COIL}$ at step 340. If saturation suction temperature $T_{SAT}$ is greater than or equal to the coil temperature $T_{COIL}$ ("No" at step 340), the process 200 clears the defrost timer at step 344. However, if the saturation suction temperature $T_{SAT}$ is less the coil temperature $T_{COIL}$ ("Yes" at step 340), the process 200 determines an absolute temperature difference $T_{DIFF}$ between the coil temperature $T_{COIL}$ and the saturation suction temperature $T_{SAT}$ at step 348. In the illustrated embodiment, the absolute temperature difference $T_{DIFF}$ between the coil temperature $T_{COIL}$ and the saturation suction temperature $T_{SAT}$ is also referred to as an evaporator internal temperature difference ("EITD"). As such, the value of the absolute temperature difference $T_{DIFF}$ indicates a temperature discrepancy between the coil temperature $T_{COIL}$ (which is a sensed or measured temperature) and the saturation suction temperature $T_{SAT}$ (which is a calculated or computed temperature, and approximates what the temperature at the coil 68 should be).

After the temperature difference $T_{DIFF}$ has been determined at step 348, the process 200 compares the temperature difference $T_{DIFF}$ with a predetermined defrost limit $T_{LIMIT}$ at step 352. In some embodiments, the predetermined defrost limit $T_{LIMIT}$ is stored in the memory and has a default value of about 100° F. or 40° C. for a cold start, and has a range from about 126° F. or 70° C. to about 18° F. or 10° C. If the temperature difference $T_{DIFF}$ is not greater than the predetermined defrost limit $T_{LIMIT}$ ("No" at step 352), the process 200 clears the defrost timer at step 344. In such a case, the process 200 has determined that the coil 68 has not been frozen and is not frosted. Otherwise, if the temperature difference $T_{DIFF}$ is greater than the defrost temperature limit $T_{LIMIT}$ ("Yes" at step 352), the process 200 has determined that the coil 68 is frozen and/or frosted. As such, the process 200 proceeds to determine if the defrost timer is active at step 356 to prepare the system 10 to defrost the coil 68. In some embodiments, the defrost timer has a limit of about 60 seconds.

If the defrost timer is active ("Yes" at step 356), the coil 68 is being defrosted, and the process 200 proceeds to increment the defrost timer at step 360. Thereafter, the process 200 proceeds to determine if the defrost timer has expired at step 364. If the defrost timer has not expired ("No" at step 364), the process 200 returns to step 224 of FIG. 3A. Otherwise, if the defrost timer has expired ("Yes" at step 364), the process 200 initiates or continues to defrost the coil 68 at step 368. After the defrost timer has been cleared at step 344, or if the defrost timer is inactive ("No" at step 356) and after the process 200 has proceeded to start or activate the defrost timer at step 372, the process 200 returns to step 224 of FIG. 3A.

After the process 200 has initiated or continued to defrost the coil 68 at step 368, the process 200 determines if the defrosting of the coil 68 has been terminated at step 376. If the defrosting of the coil 68 has not been terminated ("No" at step 376), the process 200 proceeds to store a position of the electronic throttle valve 70 at step 380 and repeats step 368. However, if the defrosting of the coil 68 has been terminated ("Yes" at step 376), the process 200 proceeds to determine the position of the electronic throttle valve 70 to determine if the position of the electronic throttle valve 70 is fully opened at step 384.

Particularly, once the controller 130 operates the temperature control system 10 in the DEFROST mode, the controller 130 resumes operation in the HS COOLING mode, the LS COOLING mode, or the HEATING mode. If the position of electronic throttle valve 70 is fully opened ("Yes" at step 384), the process 200 resets the refrigerant charge flag at step 388, and returns to step 24 of FIG. 3A. If, however, the position of the electronic throttle valve 70 is less than fully opened ("No" at step 384), the process 200 sets the refrigerant charge at step 392 to indicate the level of the refrigerant charge is acceptable, and repeats step 224 of FIG. 3A. In such cases, there is no refrigerant leak in the system 10.

Figure 3D:
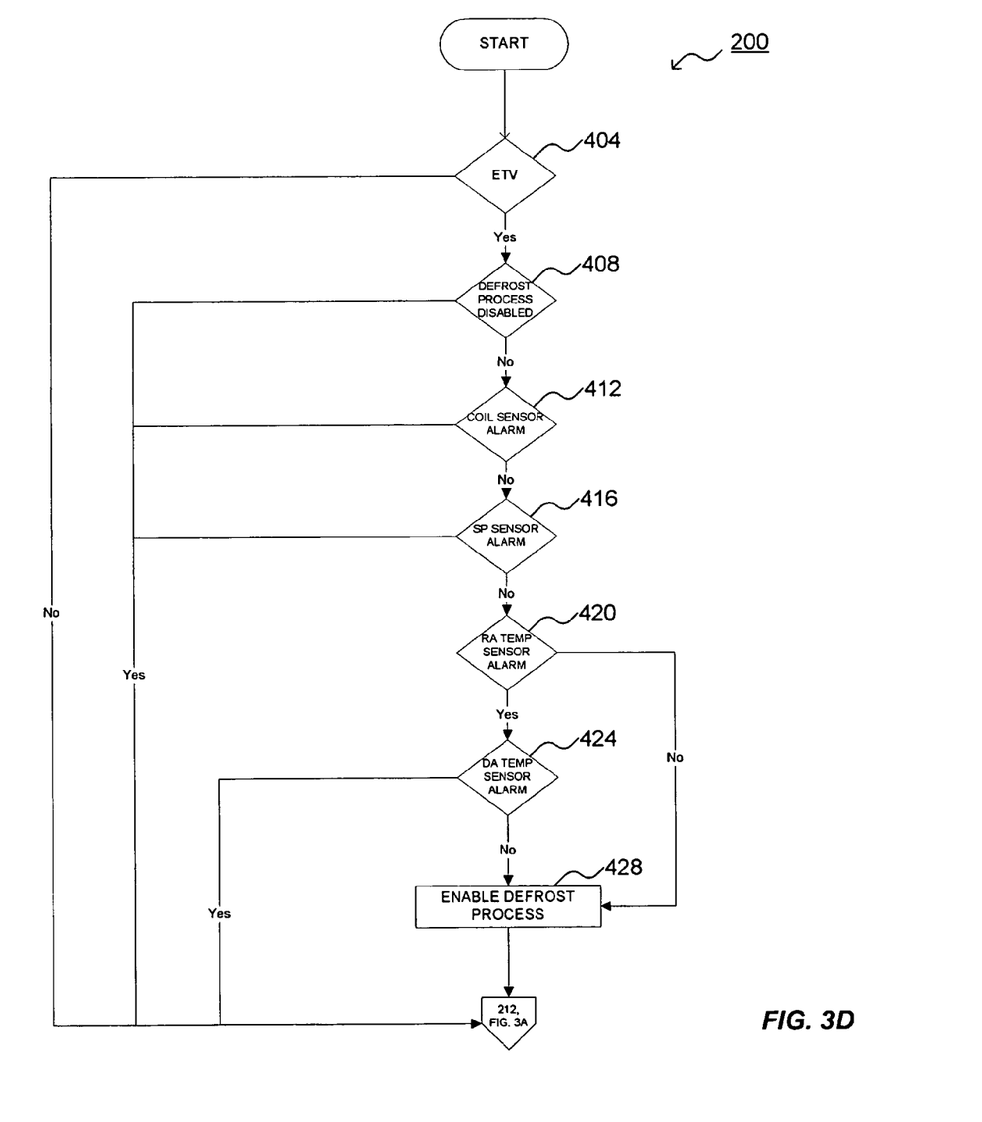

As shown in FIG. 3D, after the process 200 has been disabled at step 208 of FIG. 3A, the process 200 determines if the system 10 is equipped with an electronic throttle valve at step 404. If the system 10 is not equipped with an electronic throttle valve ("No" at step 404), the process 200 returns to step 212 of FIG. 3A. However, if the system 10 is equipped with an ETV ("Yes" at step 404), the process 200 determines if the process 200 has been disabled via a memory or the controller 130 at step 408. If the process 200 determines at step 408 that the algorithm or the defrost process has been disabled via memory or the processor ("Yes" at step 408), the process 200 returns to step 212 of FIG. 3A.

If the algorithm has not been disabled via the memory or the processor as determined at step 408 ("No" at step 408), the process 200 determines if the coil sensor alarm has been set active at step 412. If the coil sensor alarm has been set active as determined at step 412 ("Yes" at step 412), the process 200 returns to step 212 of FIG. 3A. However, if the coil sensor alarm has not been set active as determined at step 412 ("No" at step 412), the process 200 determines if the suction pressure alarm has been set active at step 416. If the SP alarm has been set active ("Yes" at step 416), the process 200 returns to step 212 of FIG. 3A. Otherwise, if the suction pressure alarm has not been set active as determined at step 416 ("No" at step 416), the process 200 determines if the RA TEMP sensor alarm has been set active at step 420. If the RA TEMP alarm is active as determined at step 420 ("Yes" at step 420), the process 200 determines if the DA TEMP sensor alarm has been set active at step 424. If the RA TEMP sensor alarm has not been set active or if the DA TEMP sensor alarm has not been set active, the process 200 enables the defrost process at step 428 and returns to step 212 of FIG. 3A. However, if the DA TEMP sensor alarm is active, the process 200 returns to step 212 of FIG. 3A.

Other features, actions, steps, and procedures can occur or be directed to occur during operation of the temperature control system 10 and during operation of the DEFROST CONTROL ALGORITHM, which are not described in detail above but are illustrated FIGS. 3A-3D.

Figure 4:
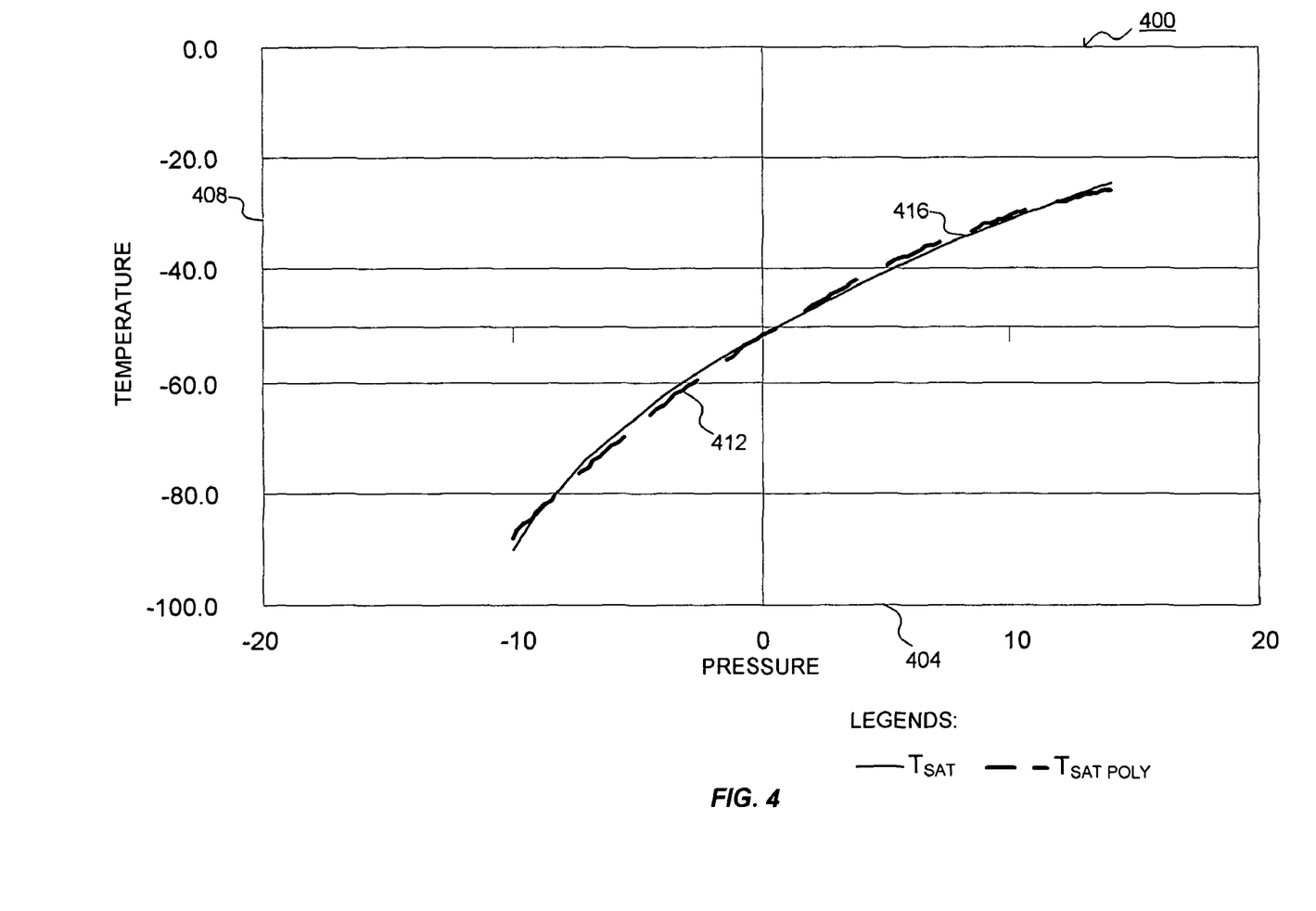
FIG. 4 shows a first lookup and data table for calculating a refrigerant saturation temperature according to an embodiment of the present invention.

FIG. 4 shows a first lookup and data table or plot 400 for calculating a refrigerant saturation suction temperature from the measured pressure. The measured or sensed suction pressure values at the suction pressure sensor 72 are measured along an x-axis 404, and the calculated saturation suction temperature values are measured along a y-axis 408. Particularly, the measured saturation suction temperature values are shown as curve 412, and the calculated temperature values determined from the first curve-fitting formula are shown as curve 416. Furthermore, the pressure values measured range from about −10 PSIG to about 16 PSIG.

Figure 5:
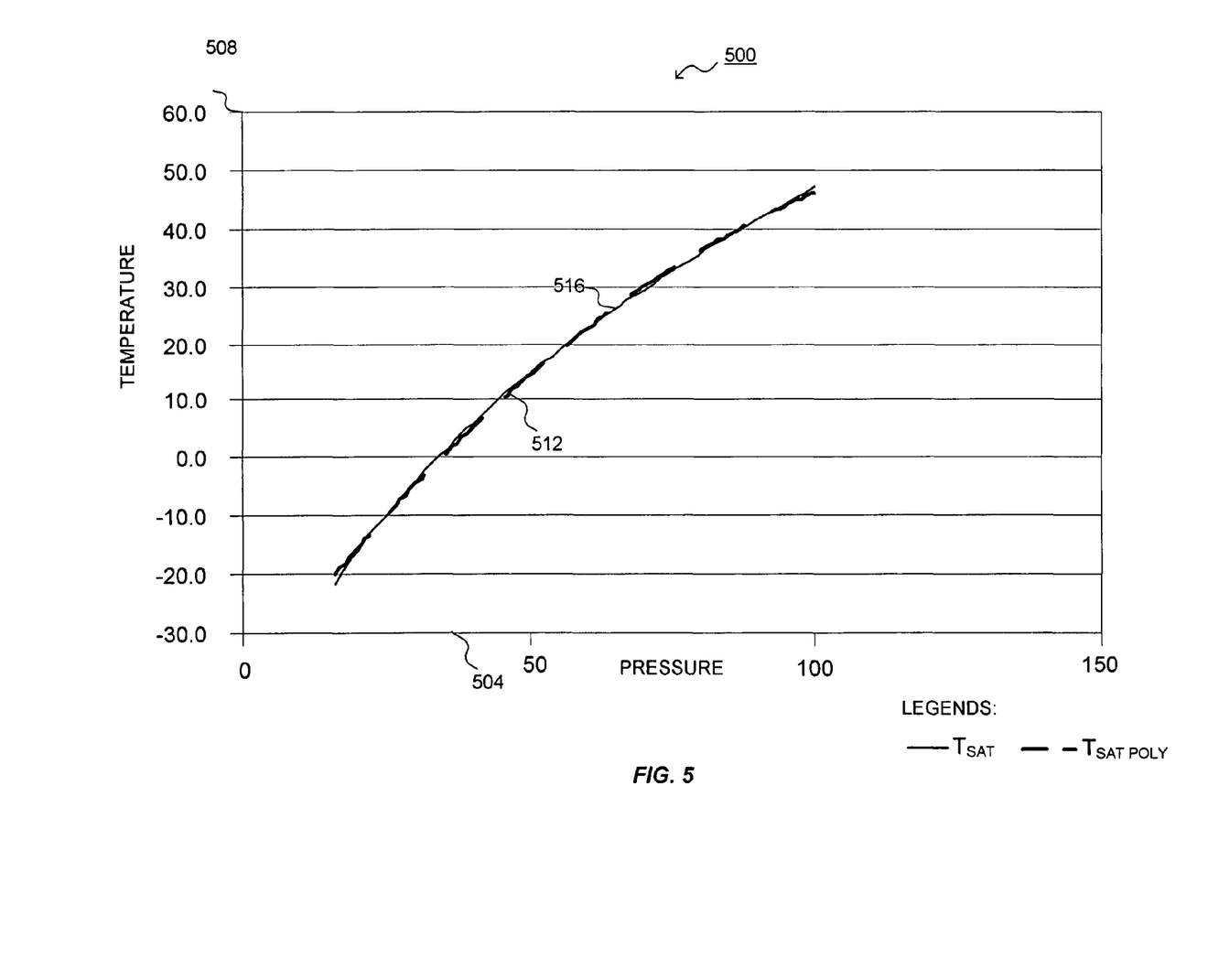
FIG. 5 shows a second lookup and data table for calculating a refrigerant saturation temperature according to an embodiment of the present invention.

Similarly, FIG. 5 shows a second lookup and data table or plot 500 for calculating a refrigerant saturation suction temperature from the measured pressure. The measured or sensed suction pressure values at the suction pressure sensor 72 are measured along a second x-axis 504, and the calculated saturation suction temperature values are measured along a second y-axis 508. Particularly, the measured saturation suction temperature values are shown as curve 512, and the calculated temperature values determined from the second curve-fit formula are shown as curve 516. Furthermore, the pressure values measured range from about 16 PSIG to about 100 PSIG.

Various features and advantages of the invention are set forth in the following claims.

What is claimed is:

1. A method of conditioning air in a vehicle load space, the method comprising the acts of:
   providing a refrigeration circuit including an evaporator and a throttle valve;
   directing refrigerant through the refrigeration circuit;
   directing load space air across the evaporator;
   sensing a first condition, the first condition being a function of one of a temperature and a pressure of the refrigerant in the refrigeration circuit away from the evaporator;
   measuring one of a temperature and a pressure of the refrigerant in the evaporator;
   using the one of the temperature and the pressure of the refrigerant in the evaporator to determine a second condition;
   determining a position of the throttle valve;
   determining a difference between the first condition and the second condition;
   initiating a defrost process of the evaporator in response to the throttle valve in a fully open position and the difference being greater than a threshold; and determining a saturation suction temperature; comparing the saturation suction temperature with an evaporator coil temperature; and initiating the defrost process in response to the saturation suction temperature being less than the evaporator coil temperature.

2. The method of claim 1, wherein sensing the first condition comprises measuring the one of the temperature and the pressure of the refrigerant at the throttle valve, the method further comprising
   determining a conversion process based on the one of the temperature and the pressure of the refrigerant at the throttle valve; and
   using the conversion process and the one of the temperature and the pressure of the refrigerant at the throttle valve to determine the first condition.

3. The method of claim 2, wherein the conversion process comprises one of converting one of the temperature and the pressure of the refrigerant at the throttle valve to the other of the temperature and the pressure, and determining one of the temperature and the pressure with a curve-fitting formula.

4. The method of claim 1, further comprising monitoring a quantity of the refrigerant in the refrigeration circuit and preventing initiation of the defrost process when the quantity of the refrigerant in the refrigeration circuit is below a predetermined value.

5. The method of claim 1, wherein the refrigeration circuit includes a compressor having a full capacity, and further comprising operating the compressor substantially at full capacity before initiating the defrost process.

6. The method of claim 1, further comprising:
   determining a position of the throttle valve; and
   interrupting the defrost process of the evaporator when the electronic throttle valve position is less than fully opened.

7. The method of claim 1, further comprising
   determining a temperature range for the load space air;
   sensing a temperature of the load space air; and
   preventing initiation of the defrost process when the temperature of the load space air is below the temperature range.

8. A system for conditioning air in a load space of a vehicle, the system comprising:
   a refrigeration circuit including an evaporator and housing refrigerant, the refrigeration circuit further including a throttle valve upstream of the evaporator;
   a first sensor positioned along the refrigeration circuit to sense a first condition, the first condition being a function of one of a temperature and a pressure of the refrigerant in the refrigeration circuit away from the evaporator;
   a second sensor positioned along the evaporator to sense one of a temperature and a pressure of the refrigerant in the evaporator;
   a controller determining a second condition based on the one of the temperature and the pressure of the refrigerant in the evaporator and to convert the one of the temperature and the pressure of the refrigerant in the refrigeration circuit away from the evaporator to determine the first condition, the controller further configured determine a position of the throttle valve, determining a difference between the first condition and the second condition, and initiating a defrost process of the evaporator in response to the throttle valve in a fully open position and the difference being greater than a threshold and wherein the controller determines a saturation suction temperature and to compares the saturation suction temperature with an evaporator coil temperature, and wherein the controller initiates the defrost process in response to the saturation suction temperature being less than the evaporator coil temperature.

9. The system of claim 8, wherein the controller is further configured to interrupt the defrost process of the evaporator when the electronic throttle valve position is less than fully opened.

10. The system of claim 8, further comprising a third sensor positioned along the refrigerant circuit to sense a quantity of the refrigerant in the refrigeration circuit, and wherein the controller is configured to determine if the quantity of the refrigerant is greater than a charge threshold and to prevent initiation of the defrost process when the quantity of the refrigerant in the refrigeration circuit is below the charge threshold.

11. The system of claim 8, further comprising a load space temperature sensor in thermal communication with the load space to determine a temperature of the air in the load space, and wherein the controller is further configured to store a set point temperature, to determine a difference between the temperature of the air in the load space and the set point temperature, and to prevent initiation of the defrost process when the temperature is below the set point temperature.

12. The method of claim 1, further comprising
terminating the defrost process;
determining a position of the throttle valve after the defrost process has been terminated; and
monitoring a quantity of the refrigerant in the refrigeration circuit based on the position of the throttle valve.

13. The method of claim 12, further comprising
determining the throttle valve in the fully open position, the fully open position indicative of a low quantity of refrigerant in the refrigeration circuit; and
initiating an alarm in response to the throttle valve in the fully open position.

14. The method of claim 12, further comprising determining the throttle valve in a less than fully open position, the less than fully open position indicative of an acceptable quantity of refrigerant in the refrigeration circuit.

15. The system of claim 8, wherein the controller is configured to monitor a quantity of refrigerant in the refrigeration circuit based on the position of the throttle valve, and wherein the controller is configured to initiate a low refrigerant alarm in response to the throttle valve being in the fully open position.

16. A system for conditioning air in a load space of a vehicle, the system comprising:
a refrigeration circuit including an evaporator and housing refrigerant, the refrigeration circuit further including a throttle valve located upstream of the evaporator;
a first sensor positioned along the refrigeration circuit adjacent the throttle valve to sense a first condition of the refrigerant in the refrigeration circuit;
a second sensor positioned adjacent the evaporator to sense a second condition of the refrigerant in the evaporator; and
a controller determining a position of the throttle valve, a saturation suction temperature, and a difference between the first condition and the second condition, the controller further determining an evaporator coil temperature based on the second condition and initiaing a defrost process of the evaporator in response to the throttle valve in a fully open position, the saturation suction temperature being less than the evaporator coil temperature, and the difference being greater than a threshold.

17. The system of claim 16, further comprising a third sensor in thermal communication with the load space to determine a temperature of the air in the load space, the controller further configured to determine a difference between the temperature of the air in the load space and a set point temperature, and to prevent initiation of the defrost process when the temperature of the load space air is below the set point temperature.

* * * * *

UNITED STATES PATENT AND TRADEMARK OFFICE
CERTIFICATE OF CORRECTION

PATENT NO. : 8,136,363 B2
APPLICATION NO. : 11/403611
DATED : March 20, 2012
INVENTOR(S) : Ludwig It is certified that error appears in the above-identified patent and that said Letters Patent is hereby corrected as shown below:

Column 12, line 47, "configured determine" should be --configured to determine--.

Column 12, line 52, "threshold" should be --threshold;--.

Column 12, line 54, "to compares" should be --compares--.

Signed and Sealed this
Twenty-ninth Day of May, 2012

David J. Kappos
*Director of the United States Patent and Trademark Office*